(12) United States Patent
Loganathan et al.

(10) Patent No.: US 10,315,186 B2
(45) Date of Patent: Jun. 11, 2019

(54) CO OXIDATION PROMOTER AND A PROCESS FOR THE PREPARATION THEREOF

(71) Applicant: Indian Oil Corporation Limited, Mumbai (IN)

(72) Inventors: Kumaresan Loganathan, Faridabad (IN); Mohan Prabhu Kuvettu, Faridabad (IN); Arumugam Velayutham Karthikeyani, Faridabad (IN); Biswanath Sarkar, Faridabad (IN); Balaiah Swamy, Faridabad (IN); Alex Pulikottil, Faridabad (IN); Pankaj Kumar Kasliwal, Faridabad (IN); Jayaraj Christopher, Faridabad (IN); Brijesh Kumar, Faridabad (IN); Santanam Rajagopal, Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 92 days.

(21) Appl. No.: 14/592,808

(22) Filed: Jan. 8, 2015

(65) Prior Publication Data

US 2015/0352525 A1  Dec. 10, 2015

(30) Foreign Application Priority Data

Dec. 30, 2013  (IN) .......................... 4120/MUM/2013

(51) Int. Cl.

| | |
|---|---|
| *B01J 23/42* | (2006.01) |
| *B01J 23/44* | (2006.01) |
| *B01J 37/00* | (2006.01) |
| *B01J 37/02* | (2006.01) |
| *C10G 11/00* | (2006.01) |
| *B01J 37/04* | (2006.01) |

(Continued)

(52) U.S. Cl.
CPC ............... *B01J 23/44* (2013.01); *B01J 21/04* (2013.01); *B01J 23/42* (2013.01); *B01J 35/00* (2013.01); *B01J 35/0006* (2013.01); *B01J 35/08* (2013.01); *B01J 35/1019* (2013.01); *B01J 35/1038* (2013.01); *B01J 35/1042* (2013.01); *B01J 35/1061* (2013.01); *B01J 35/1066* (2013.01); *B01J 37/009* (2013.01); *B01J 37/0072* (2013.01); *B01J 37/0207* (2013.01);

(Continued)

(58) Field of Classification Search
CPC .... B01J 21/04; B01J 35/1019; B01J 35/1038; B01J 35/1042; B01J 35/1061; B01J 35/1066

See application file for complete search history.

(56) References Cited

U.S. PATENT DOCUMENTS

| | | | |
|---|---|---|---|
| 4,093,535 A | 6/1978 | Schwartz | |
| 4,097,535 A | 6/1978 | Yang et al. | |

(Continued)

FOREIGN PATENT DOCUMENTS

| | | |
|---|---|---|
| CA | 967136 A | 5/1975 |
| EP | 0742044 A1 | 11/1996 |
| EP | 1879982 B1 | 12/2002 |

*Primary Examiner* — Jun Li
(74) *Attorney, Agent, or Firm* — Snell & Wilmer L.L.P.

(57) ABSTRACT

The invention relates to a CO oxidation promoter additive and a method of its preparation. The CO oxidation promoter additive is having improved apparent bulk density and attrition properties for use in hydrocarbon conversion during fluid catalytic cracking. The CO oxidation promoter additive has a better CO to $CO_2$ conversion.

22 Claims, 2 Drawing Sheets

(51) Int. Cl.
  *B01J 37/06* (2006.01)
  *B01J 35/00* (2006.01)
  *B01J 35/08* (2006.01)
  *B01J 37/03* (2006.01)
  *B01J 21/04* (2006.01)
  *B01J 35/10* (2006.01)
  *C10G 11/02* (2006.01)
  *C10G 11/18* (2006.01)

(52) U.S. Cl.
  CPC ......... *B01J 37/0236* (2013.01); *B01J 37/038* (2013.01); *B01J 37/04* (2013.01); *B01J 37/06* (2013.01); *C10G 11/00* (2013.01); *C10G 11/02* (2013.01); *C10G 11/18* (2013.01); *C10G 2300/405* (2013.01); *Y02P 30/446* (2015.11)

(56) References Cited

U.S. PATENT DOCUMENTS

| | | |
|---|---|---|
| 4,171,286 A | 10/1979 | Dight et al. |
| 4,199,435 A | 4/1980 | Chessmore et al. |
| 4,222,856 A | 9/1980 | Hansel et al. |
| 4,332,782 A * | 6/1982 | Scherzer ............ B01J 21/04 423/625 |
| 4,443,553 A | 4/1984 | Chiang et al. |
| 4,476,239 A | 10/1984 | Chiang et al. |
| 4,542,118 A | 9/1985 | Nozemack et al. |
| 4,544,645 A | 10/1985 | Klaassen et al. |
| 4,585,752 A | 4/1986 | Ernest |
| 4,608,357 A | 8/1986 | Silverman et al. |
| 5,110,780 A | 5/1992 | Peters |
| 5,164,072 A | 11/1992 | Peters |
| 5,565,399 A | 10/1996 | Fraenkel et al. |
| 6,117,813 A | 9/2000 | McCauley et al. |
| 6,165,933 A | 12/2000 | Peters et al. |
| 6,358,881 B1 | 3/2002 | Peters et al. |
| 6,713,428 B1 * | 3/2004 | Le Goff ............ B01J 21/04 423/625 |
| 2007/0129234 A1 | 6/2007 | Stockwell |
| 2008/0125610 A1 * | 5/2008 | Lockemeyer ............ B01J 23/50 564/503 |
| 2009/0050529 A1 | 2/2009 | Rainer et al. |

* cited by examiner

CO OXIDATION PROMOTER AND A PROCESS FOR THE PREPARATION THEREOF

CROSS-REFERENCE TO RELATED APPLICATIONS

This patent application claims priority pursuant to 35 U.S.C. § 119(b) and 37 CFR 1.55(d) to Indian Patent Application No. 4120/MUM/2013, filed Dec. 30, 2013, which application is incorporated herein in its entirety, by reference.

FIELD OF THE INVENTION

The invention relates to an improved carbon monoxide (CO) oxidation promoter additive and a method of its preparation. Particularly, the invention relates to a CO oxidation promoter additive having improved apparent bulk density and attrition properties for use in hydrocarbon conversion during fluid catalytic cracking.

BACKGROUND OF THE INVENTION

In fluid catalytic cracking (FCC), a stream of hydrocarbon feed when contacted with fluidized catalyst in reactor at temperature around 490 to 550° C. is converted into valuable petroleum products. In the process a significant amount of coke gets deposited on the catalyst which makes it unfit for further reaction. However, a major amount of the activity of the spent catalyst can be regenerated for further use by burning off most of the deposited coke in presence of oxygen rich air in regenerator. In this process, coke is converted into carbon monoxide and carbon dioxide. Generally regeneration is carried out at high temperatures of about 600 to 690° C. Higher the temperature more is the removal of coke. After this process the regenerated catalyst is returned to the cracking zone for catalyzing the cracking of heavy hydrocarbons further.

A major disadvantage associated while regenerating FCC catalyst is that of afterburning, which implies further burning of CO to $CO_2$ and takes place in dilute phase. It is advisable to avoid afterburning as it could lead to very high temperatures, which may damage the equipment as well as destroy the catalyst activity permanently.

Furthermore, in recent years, the environment regulations are becoming very stringent with respect to the emission of CO into the atmosphere, which necessitate changes in the functioning of FCC units, irrespective of the costs of petroleum refining. Hence need has arisen to develop a catalyst or additive or a process which can reduce or eliminate afterburning as well as emission of CO into atmosphere.

In processes disclosed in U.S. Pat. Nos. 4,097,535 and 4,093,535, noble metals such as Pt, Pd, have been impregnated in the Y-type zeolite which is the active component of the FCC catalyst. Such catalysts with 25 ppm Pt and 25 ppm Pd though significantly control $CO_2/CO$ ratio, suffer from flexibility limitations such as, (1) addition of CO-combustion promoter cannot be terminated as and when required, (2) in order to increase the $CO_2/CO$ ratio entire inventory has to be discharged and a fresh, more active composite FCC catalyst has to be loaded, (3) precious metal may be buried by coke in super cages of zeolite and limits platinum's efficacy.

The use of precious metals to catalyze oxidation of carbon monoxide in the regenerators of FCC units has gained broad commercial acceptance. In the earlier stages of development as described in U.S. Pat. No. 4,171,286, the precious metal was deposited on the particles of cracking catalyst. But, the present practice is generally to supply a promoter in the form of solid fluidizable particles containing a precious metal, such particles being physically separate from the particles of cracking catalyst. The precious metal or its compound is supported on particles of suitable carrier material and the promoter particles are usually introduced into the regenerator separately from the particles of cracking catalyst. The particles of promoter are not removed from the system as fines and are circulated along with cracking catalyst particles during the cracking/stripping/regeneration cycles.

U.S. Pat. No. 4,199,435 disclosed a combustion promoter selected from the group of Pt, Pd, Ir, Os, Ru, Rh, Re and copper on an inorganic support. Promoter products as disclosed in U.S. Pat. No. 4,222,856 and used on a commercial basis in FCC units include calcined spray dried porous microspheres of kaolin clay impregnated with a small amount (e.g., 100 to 1500 ppm) of platinum. Most commonly used promoters are obtained by impregnating a source of platinum on microspheres of high purity porous alumina, typically gamma alumina. U.S. Pat. No. 4,544,645 discloses a bimetallic of Pd with every other Group VIII metal but Ru.

U.S. Pat. No. 4,585,752 has mentioned the addition of rare earth metal on Pt based CO promoters. U.S. Pat. No. 4,608,357 refers to palladium based effective CO oxidation promoter. Here, palladium is supported on particles of a specific form of silica-alumina, namely leached mullite.

U.S. Pat. Nos. 5,164,072 and 5,110,780, relate to an FCC CO promoter having Pt on La-stabilized alumina, preferably about 4-8 weight percent $La_2O_3$.

U.S. Pat. No. 5,565,399 discloses a novel CO promoter composed of catalytic platinum particles dispersed over alumina support particles and stabilized physically and chemically with a mixture of rare earth for higher catalytic activity, longer catalyst durability and better unit retention of the catalyst in a cracking unit. U.S. Pat. No. 6,117,813 discloses promoter consisting of a Group VIII transition metal oxide, Group IIIB transition metal oxide and Group IIA metal oxide.

U.S. Pat. Nos. 6,165,933 and 6,358,881 describe compositions comprising (i) an acidic oxide support, ii) an alkali metal and/or alkaline earth metal or mixtures thereof, (iii) a transition metal oxide having oxygen storage capability, and (iv) palladium to promote CO combustion in FCC processes while minimizing the formation of $NO_x$.

From the prior art patents U.S. Pat. Nos. 4,542,118, 4,476,239, 4,443,553, EP 0742044 A1 and CA 9,671,36 it can be seen that the flocculating property of alumina is being arrested by the application of aluminium chlorhydrol, aluminum hydroxynitrate in a significant quantity. It may be noted that since aluminum chlorhydrol contains 17% of chlorine therefore its application can corrode the hardware being used for shaping of microspheres. Beside, chlorine and nitrate gases emanating while processing such dispersant loaded products is harmful to atmosphere and is well known for their adverse effects on human health.

It has been disclosed in the prior art (U.S. Pat. Nos. 4,476,239, 4,443,553 and CA Patent 9,671,36) that addition of a small amount of aluminium hydroxy chloride or hydroxy nitrate reduces the viscosity of the slurry to an extent and increases the free flow nature of the slurry for easy spray drying. U.S. Pat. No. 4,542,118 also discloses the preparation of an organic composition from slurry of alumina and aluminium chlorhydrol in order to reduce the viscosity.

EP 18799821 discloses a composition for promoting CO oxidation with controlled emission of NOx. The composition contains alumina as support, ceria, praseodymium oxide, along with transition metals like Cu, Ag, Zn. US 2007/0129234 describes a CO oxidation promoter for FCC which minimizes co-incidental HCN and $NH_3$ oxidation. The catalyst comprising mixture of base metal oxides, possibly containing promoters of Ni, La, alkaline earth, rare earth, etc., on alumina support. The disclosed catalyst has a CO oxidation activity per weight of catalyst less than 10% and at least 0.2% activity for CO oxidation per unit weight of a catalyst comprising 500 ppm platinum on alumina at a temperature of at least 1100° F.

US2009/0050529 teaches a composition for CO oxidation promoter with the basic support material being a hydrotalcite compound. The composition comprises at least one oxide of a lanthanide series element, one oxide of a transition metal preferably from Group IB and IIB of the periodic table and one precious metal, Pt along with hydrotalcite support.

From the above discussion it is clear that with growing regulations on CO emission in the environment and for circumventing the problem of afterburning associated with the FCC technology, improved methods are continuously sought which besides being environmental friendly also provides efficient oxidation of CO.

SUMMARY OF THE INVENTION

The present invention addresses the much desired eco-friendly approach for reduction of CO emission from hydrocarbon conversion processes. The present invention provides an improved CO oxidation promoter additive having improved physico-chemical properties like apparent bulk density (ABD), attrition strength as well as high surface area. The invention, however, may be contemplated to prove useful in addressing other problems and deficiencies in a number of technical areas.

The present invention provides a support for preparing CO oxidation promoter additive. The said additive support comprises pseudoboehmite alumina having a crystallite size of about 10 to about 45 Å, a surface area of about 250 to about 450 $m^2/g$, an average pore diameter of about 35 to about 70 Å, and an average pore volume of about 0.3 to about 0.6 $cm^3/g$. Preferably, the crystallite size of the additive support is about 10 to 30 Å. The additive support preferably has a surface area of about 270 to 430 $m^2/g$. The additive support preferably has a pore volume of about 0.3 to about 0.5 $cm^3/g$ in pores of from 35 to 60 Å. The additive support has less than 0.2% of residual soda and has a crystallinity of more than 92%. In a preferred embodiment, the additive support has a crystallite size of about 20 Å.

The present invention also provides a process for preparing the additive support comprising pseudoboehmite alumina. The process comprises:
(a) reacting aluminium sulphate with sodium hydroxide at a temperate of about 25 to about 100° C. to obtain a slurry,
(b) continuing the reaction until pH of the slurry is reached to about 9.5,
(c) filtering the slurry to obtain a wet cake,
(d) washing the wet cake with hot water, and
(e) drying the resultant to obtain pseudoboehmite alumina support.

In the present invention, the process of preparing the additive support preferably comprises sequential addition of sodium hydroxide solution into solution of aluminium sulphate while reacting the aluminium sulphate with sodium hydroxide.

In another aspect, the present invention provides a process for preparing microspheres of the additive support comprising pseudoboehmite alumina. The process comprises:
(a) reacting aluminium sulphate with sodium hydroxide at a temperature of about 25 to about 100° C. to obtain a slurry,
(b) continuing the reaction until pH of the slurry is reached to about 9.5,
(c) filtering the slurry to obtain a wet cake,
(d) washing the wet cake with hot water,
(e) hydrothermal treatment for crystallization of wet cake at a crystallization temperature of 70 to 130° C. for the duration of above 12 h-48 h and filter the crystallize material to obtain pseudoboehmite alumina support;
(f) preparing a slurry by intimate mixing of pseudoboehmite alumina support and water,
(g) peptizing with an organic acid under stirring, and
(h) spray drying the slurry of step (g) to obtain microspheres of pseudoboehmite alumina support.

In a preferred aspect, the present invention provides a process for the preparation of a carbon monoxide (CO) oxidation promoter additive having improved apparent bulk density (ABD) and attrition properties for use in hydrocarbon conversion. The process comprises:
(a) preparing a pseudoboehmite alumina support as above
(b) calcining the microspheres of step (d) to obtain calcined microspheres,
(c) impregnating the microspheres of step (e) with a group VIII B metal and drying to obtain CO oxidation promoter additive.

The present invention also provides a CO oxidation promoter additive having an apparent bulk density (ABD) above 0.79 $g/cm^3$, and an attrition of less than 5%. Surface area 170-250 $m^2/gm$, pore volume 0.2-0.5 cc/gm and average pore diameter in the range of 40-60 Å. The CO oxidation promoter additive of the present invention is used in the conversion of CO to $CO_2$. The CO oxidation promoter additive of the present invention has conversion efficiency in the range of 85-97 and $CO_2/CO$ ratio in the range of 20-51.

In another aspect, the present invention provides a method of promoting CO oxidation during hydrocarbon conversion or fluid catalytic cracking of a hydrocarbon feedstock into lower molecular weight components, said method comprising contacting a hydrocarbon feedstock with a cracking catalyst and the CO oxidation promoter additive of the present invention, said CO oxidation promoter being present in an amount sufficient to reduce said CO emissions. In a preferred embodiment, the CO oxidation promoter additive is mixed with the catalyst at 0.3% concentration having platinum less than 3 ppm in the total catalyst and additive mixture. The percent CO conversion efficiency of said process is in the range of 85-97 and $CO_2/CO$ ratio is in the range of 20-51. In a preferred embodiment, the catalyst used in said process is a spent catalyst.

BRIEF DESCRIPTION OF ACCOMPANYING DRAWING

FIG. 2: TEM image of pseudoboehmite alumina synthesized (a) with hydrothermal treatment for 30 h at 90° C. (b)

without hydrothermal treatment. (Insert: Corresponding electro diffraction pattern of alumina)

INFERENCE FROM TEM ANALYSIS

Figure 2:
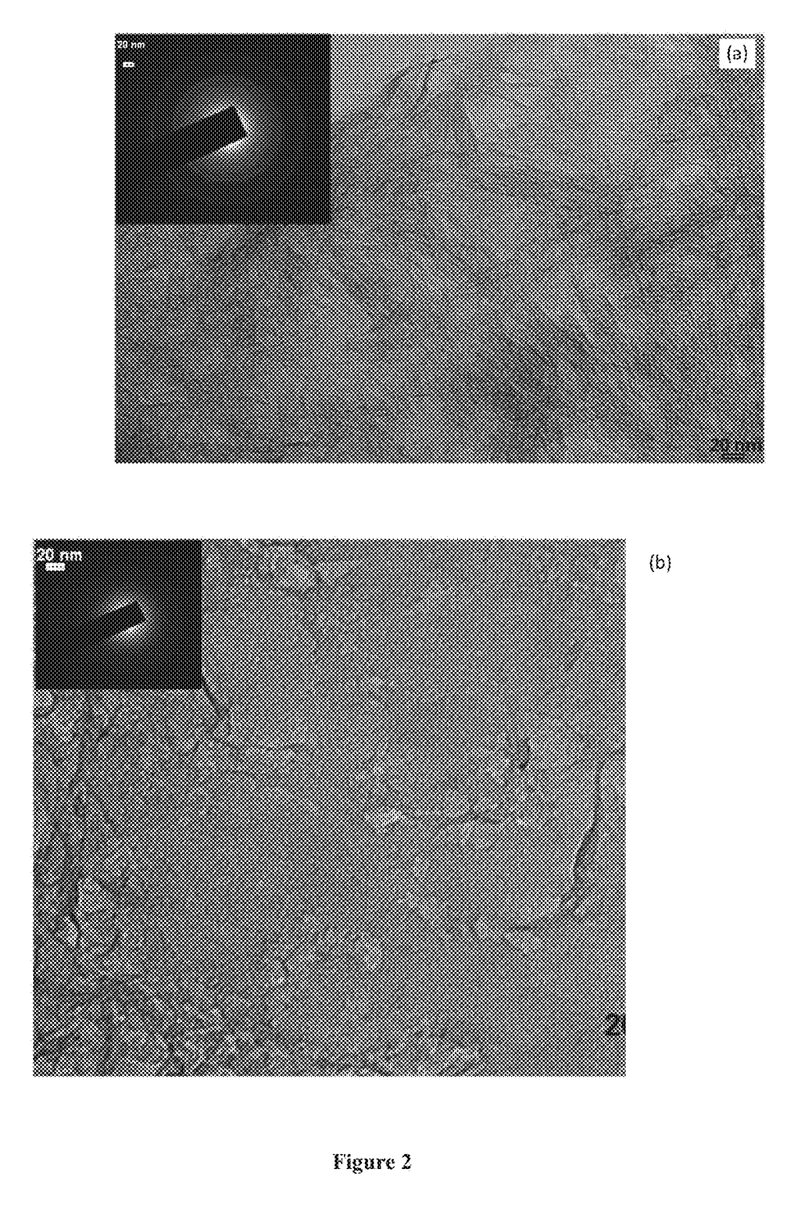

After the hydrothermal treatment at crystallization temperature 90° ° C. for 30 h, formation of nano structured needles are clearly seen in the TEM image (FIG. 2a). It is also confirmed that the pseudoboehmite alumina synthesized without hydrothermal treatment could not found any nanostructures. However, TEM analysis shows formation of bulky agglomerates of alumina particles (FIG. 2b). In addition, crystallinity pseudoboehmite alumina was also increased in hydrothermal treated alumina compare to other method of preparation which is confirmed from electro diffraction pattern (insert of FIGS. 2 a & b).

DESCRIPTION OF THE INVENTION

There is a need to devise methods whereby the emission of CO can be reduced, which is produced during hydrocarbon conversion. Many additives and methods have been proposed in the prior art to achieve this objective. The present invention addresses the much desired eco-friendly approach for reduction of CO emission from hydrocarbon conversion processes. The present invention provides an improved CO oxidation promoter additive having improved physico-chemical properties like apparent bulk density (ABD), attrition strength as well as high surface area. The CO oxidation promoter additive of the present invention has low attrition due to which, the life of the additive is increased and also the CO conversion efficiency is improved. The invention, however, may be contemplated to prove useful in addressing other problems and deficiencies in a number of technical areas, which are not specifically described in the present application.

The present invention discloses a pseudoboehmite alumina support prepared through a novel route which imparts the said alumina improved properties in terms of apparent bulk density, attrition strength as well as high surface area, suitable for preparing CO oxidation promoter additive. The invention also relates to the CO oxidation promoter additive developed from such pseudoboehmite alumina which is used in fluid catalytic cracking.

One aspect of the present invention discloses the preparation of the pseudoboehmite alumina support by reacting a source of alumina with a basic aqueous solution at ambient temperature ranging from 25-100° C. The aluminium source used for the purpose can be selected from a group including but not limited to aluminum sulfate, aluminum chloride, aluminum nitrate etc. The aqueous solution of the base can be prepared using any base source including sodium hydroxide, sodium aluminate, ammonium hydroxide, etc.

However, the inventors of the present invention have found that the use of aluminum sulfate as the alumina source and sodium hydroxide as the base source have specific advantages in the properties of the pseudoboehmite alumina support, as compared to other alumina and base sources.

In a preferred embodiment, the process for preparing the pseudoboehmite alumina support, or the additive support comprises the steps of:
(a) reacting aluminium sulphate with sodium hydroxide at a temperate of about 25 to about 100° C. to obtain a slurry, by sequential addition of sodium hydroxide solution to the solution of aluminium sulphate.
(b) continuing the reaction until pH of the slurry is reached to about 9.5,
(c) filtering the slurry to obtain a wet cake,
(d) washing the wet cake with hot water, and
(e) drying the resultant to obtain pseudoboehmite alumina support.

In a preferred embodiment, the reaction of aluminum sulphate with sodium hydroxide is carried out at a temperate of about 35° C. for 0.5 to 5 hours. The washing of wet cake is carried out by hot water. Usually the hot water is in the temperature range of 60 to 80° C.

The pseudoboehmite alumina support prepared through this novel route possesses low crystallite size. The crystallite size (D) was measured employing Scherrer equation, $D=K\lambda/\beta \cos\theta$, where D is the crystal size of the pseudoboehmite alumina, $\lambda$ is the X-ray wavelength (1.54 Å), $\beta$ is the full width at half maximum (FWHM) of the catalyst, K is a constant (equal to 0.89) and $\theta$ is the Bragg's angle.

In another aspect, the present invention provides preparation of microspheres of additive support. The microspheres have advantages due to its spheroidal shape, including good flow properties. The microspheres are prepared by spray drying slurry of pseudoboehmite alumina as a support. In a preferred embodiment, the microspheres of the additive support are prepared by the process comprising:
(a) reacting aluminum sulphate with sodium hydroxide at a temperature of about 25 to about 100° C. to obtain a slurry, by sequential addition of sodium hydroxide solution to the solution of aluminum sulphate
(b) continuing the reaction until pH of the slurry is reached to about 9.5,
(c) filtering the slurry to obtain a wet cake,
(d) washing the wet cake with hot water to obtain pseudoboehmite alumina support,
(e) hydrothermal treatment for crystallization of wet cake at a crystallization temperature of about 70 to about 130° C. for the duration of above 12 h-48 h and filter the crystallize material to obtain pseudoboehmite alumina support,
(f) preparing a slurry by intimate mixing of pseudoboehmite alumina support and water,
(g) peptizing with an organic acid under stirring, and
(h) spray drying the slurry of step (g) to obtain microspheres of pseudoboehmite alumina support.

The organic acid for peptizing is selected from the group comprising formic acid, acetic acid, and mixtures thereof. The said obtained microspheres are further calcined to obtain calcined microspheres. The calcining is carried out at a temperature of about 450 to about 650° C.

The psuedoboehmite alumina support possesses crystallite size in the range of about 10 to about 45 Å, has high surface area in range of about 250 to 450 m²/g, average pore diameter of about 35 to 60 Å and pore volume between about 0.3 and 0.6 cm³/g. Such pseudoboehmite alumina support having adequate self-binding properties, high surface area, and low crystallite size allows it's shaping up into microspheres having high density and low attrition strength without employing any alumina based dispersants like aluminum chlorohydrate, hydroxy nitrate or phosphate. During calcination, it gets converted to gamma phase at temperature range of below 480° C.

Another aspect of the invention discloses the preparation of CO oxidation promoter additive in the form of additive microspheres from the pseudoboehmite alumina support prepared according to the present invention. The pseudobochmite alumina support employed for production of CO combustion promoter additive possess crystallite size in the range 10-45 Å, gets converted to gamma phase at temperature range below 480° C., high surface area in the range of 280 to 450 m²/g, average pore diameter of 35-60 Å and pore volume between 0.3 and 0.6 cm³/g. Such pseudoboehmite alumina support with adequate self-binding properties, high surface area, and low crystallite size allows it's shaping up into microspheres having high density and low attrition strength without employing any alumina based dispersants like aluminum chlorohydrate, hydroxy nitrate or phosphate.

CO oxidation promoter additive having improved apparent bulk density (ABD) and attrition properties for use in hydrocarbon conversion is prepared stepwise from the alumina support. The process comprises the steps of:
(a) preparing a pseudoboehmite alumina support by reacting aluminium sulphate with sodium hydroxide at a temperature ranging from about 25 to about 100° C.,
(b) hydrothermal treatment for crystallization of wet cake at a crystallization temperature of about 70 to about 130° C. for the duration of above 12 h-48 h and filter the crystallize material to obtain pseudoboehmite alumina support,
(c) preparing a slurry by mixing the pseudoboehmite alumina of step (a) with water,
(d) peptizing the slurry prepared in step (b) with an organic acid under stirring,
(e) spray drying the peptized slurry obtained in step (c) to obtain microspheres,
(f) calcining the microspheres of step (d) to obtain calcined microspheres,
(g) impregnating the microspheres of step (e) with a group VIII B metal and drying to obtain CO oxidation promoter additive.

In another embodiment, the already prepared pseudoboehmite alumina support can be taken, which is prepared according to the present invention, for preparing microspheres. Slurry is prepared by intimate mixing of pseudoboehmite alumina support and water and is peptized with an acid selected from organic source. The organic acid may be selected from the group including but not limited to formic acid, acetic acid, etc. The treatment with organic acid facilitates the smooth gelling of the slurry. Uniform slurry composition is ensured by stirring and mixing for at least 1 to 3 hours.

The prepared slurry is then spray dried. During the spray drying step, the moisture content of the particle gets substantially reduced. The spray drying produces additive microspheres having adequate particle size.

After spray drying, the product obtained is calcinated at high temperature, usually in the range of 450 to 650° C.

In preferred embodiment, the reaction of aluminum sulphate with sodium hydroxide is carried out by sequential addition of sodium hydroxide solution into solution of aluminum sulphate. The reaction of aluminium sulphate with sodium hydroxide is continued until the pH of the slurry is reached to about 9.5, and then the slurry is filtered to obtain a wet cake, and the wet cake is washed with water to obtain pseudoboehmite alumina support. The said support is peptized with organic acid selected from the group comprising formic acid, acetic acid, and mixtures thereof. The calcination is carried out at a temperature of about 450 to about 650° C. The said calcined support is then impregnated with a group VIII B metal, selected from platinum and palladium.

The calcined microspheres can be measured for attrition strength at a high constant air jet velocity. The fine additives are removed continuously from the attrition zone by elutriation into a flask-thimble assembly, which are weighed at intervals. These test conditions are similar to those as encountered during hydrocarbon conversion operations. This attrited or overhead additive so measured is expressed as the weight percent overhead. Percent attrition is measured as follows:

$$\frac{\% \text{ Weight(g) of the additive overload in 5-20 h attrition}}{\text{Initial weight of the additive(g)} - \text{weight of the additive(g) overhead in 0-5 h}} \times 100 =$$

Low % attrition value is desirable for retaining the microspheres in the reactor.

Activity is imparted to the aforesaid microspheres by impregnating suitable metal on the microspheres. The impregnated metal may be selected from the group of VIIIB and is preferably platinum, and/or palladium. Impregnation of the metal is done by slurrying the calcined particles in precalculated weight of a source of metal. For platinum most commonly used source is dilute chloroplatinic acid/platinum chloride. The impregnated product is finally dried up. The impregnated microspheres can also be evaluated after calcination.

The evaluation of platinum/palladium doped CO oxidation promoter additive has been carried out for CO oxidation. CO combustion promotion efficiency of a promoter is determined on the basis of difference between CO in absence of CO oxidation promoter additive and in presence, divided by original CO concentration. It is found that the addition of platinum increases the $CO_2/CO$ ratio.

Experiments have proved that the use of organic acid in the preparation methodology has improved the attrition strength of the prepared promoter without the use of aluminium chlorohydrate, as combination of alumina and an acid turns the support to generate adequate apparent bulk density (ABD) and attrition strength. Thus developed additive has ABD above 0.79 g/cm³ & % attrition below 5.

Further, another aspect of the present invention mentions the use of CO oxidation promoter additive with the catalyst. In an embodiment of the present invention the additive has been mixed with spent catalyst at 0.3% concentration having platinum <3 ppm in the total catalyst & additive mixture. The final product was evaluated. Percent CO conversion efficiency was found to be in the range of 85-97 and $CO_2/CO$ ratio in the range of 20-51.

The current invention describes the preparation of pseudoboehmite alumina additive support and eventually the CO oxidation promoter additive from a novel process, whereby the support and the CO oxidation promoter additive so prepared have improved properties, including low % attrition, without using aluminium chlorhydrol or aluminum hydroxynitrate which is an environmentally harmful chemical used in the existing art. Therefore the method is environmental friendly as well.

Due to the inherent flexibility, such CO oxidation promoter additive in FCC operations also allows yield optimization through use of both partial and complete CO combustion. Therefore, with varying requirements of different refineries, even customization of CO oxidation promoter additive system can be possible.

The CO oxidation promoter additive disclosed in the present invention also offers higher catalysts activity, increased gasoline octane number and prevention of after burning as compared to the catalyst system known in the art. Apart from these benefits, the newly developed additive is cost effective since it is prepared from cheap raw materials like aluminum sulphate and sodium hydroxide.

In addition to this, the application of such system would not require any additional hardware in the catalysts plant and refinery as well. It can be directly implemented in the existing catalysts preparation plants. Therefore this can also prove to be economically beneficial for FCC unit in refineries.

Having described the basic aspects of the present invention, the following non-limiting examples illustrate specific embodiment thereof.

Example 1

Preparation of Pseudoboehmite Alumina

In one of the exemplary method 100 g batch of pseudoboehmite alumina support is prepared employing aluminum sulphate and sodium hydroxide as raw materials by sequential addition method. In a 5 liter vessel, 630 g of aluminum sulphate ($Al_2(SO_4)_3.16H_2O$) was dissolved in 700 g of demineralized water (DM) and kept under stirring. To this solution, sodium hydroxide solution (240 g in 2800 g DM water) was added in about 30 minutes at temperature 35° C. till the pH reached to 9.5. After one hour, entire slurry was filtered out and washed repeatedly with hot water to give pseudoboehmite alumina with residual soda less than 0.2% and crystallinity more than 92%. The crystallite size (D), measured employing Scherrer equation, D=Kλ/β Cos θ was found to be 20 Å. The same experiment was repeated with crystallization time ranging from 1 to 48 hours at crystallization temperature 60-130° C.

Figure 1:
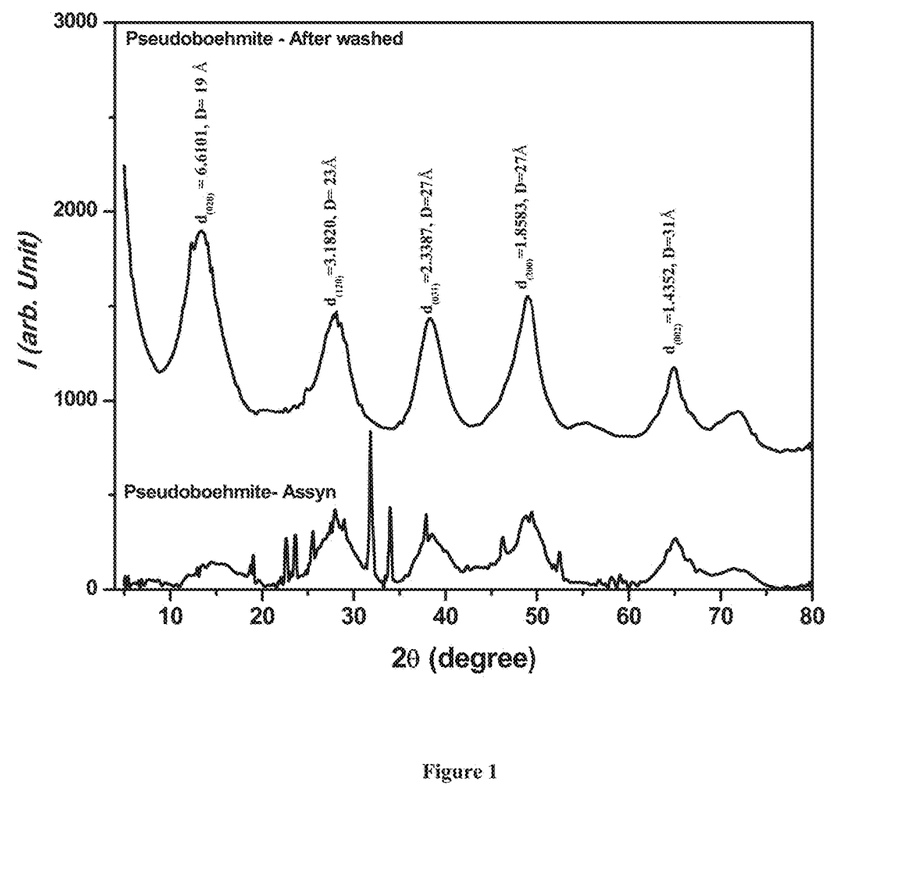
FIG. 1: XRD patterns of the as-synthesized and after washed pseudoboehimite alumina; Corresponding d-spacing value and crystallite size (D) are indicated for each plan.

FIG. 1 shows the XRD patterns of the as-synthesized and after washed pseudoboehimite alumina support. Corresponding d-spacing value and crystallite size (D) are indicated for each plan. For scale up, the batch size of 500 g of pseudoboehmite alumina support was prepared by the same procedure in 20 liter vessel. The characterization and evaluation were also found to be comparable with small batch size materials.

Example 2

The sequential addition experiment has also been conducted in reverse i.e. addition of aluminium sulphate solution in sodium hydroxide solution and results obtained are shown in Table 1. The surface area and X-ray crystallinity for these products with crystallisation time of 2 h are given in Table 1.

Example 3

Alternatively, pseudoboehmite alumina was also prepared by employing aluminum sulphate and sodium hydroxide as raw materials by simultaneous addition method. 100 g batch of alumina was prepared by dissolving 630 g of aluminum sulphate ($Al_2(SO_4)_3.16H_2O$) in 700 g of DM water (Solution A). 240 g Sodium hydroxide was added in 2800 g DM water (Solution B). In a 5 L vessel, both Solutions A and B were added in about 30 minutes with fixed addition rate at temperature 35° C. maintained the pH 9.5 till the end of addition. Continuing the stirring for one hour, entire slurry was filtered out and washed repeatedly with hot water to give pseudoboehmite alumina with residual soda less than 0.2% and the same experiment was repeated with crystallisation time ranging from above 12 h to 48 hours at crystallisation temperature 60-130° C. The surface area and X-ray crystallinity for this product with crystallisation time of 2 h is also given in Table 1.

TABLE 1

Physico - Chemical Properties of Different Pseudoboehmite Alumina Support

| | Pseudoboehmite Alumina Support Preparation Method | Surface area ($m^2/g$) | Average pore size distribution (Å) | Average Pore volume ($cm^3/g$) | Crystallinity (%) | Crystallite size (Å) | Result |
|---|---|---|---|---|---|---|---|
| 1 | Prepared by sequential addition of sodium hydroxide solution to aluminium sulphate solution (Example 1) | 421 | 54 | 0.33 | 92 | 24 | Pass |
| 2 | Prepared by simultaneous addition (Example 3) | 348 | 72 | 0.44 | 85 | 55 | Fail |
| 3 | Prepared by sequential addition of aluminium sulphate solution to sodium hydroxide solution (Example 1) | 324 | 48 | 0.30 | 88 | 42 | Fail |
| 4 | Prepared through the methods known in the existing art. EP0742044A1 | 258 | 42 | 0.32 | 89 | 34 | Pass |

From the table 1, the method of addition of sodium hydroxide to aluminum sulphate was achievable to obtain small crystallite size and high surface area pseudobgehmite alumina. However, the other approaches in sequential addition and simultaneous addition are providing the large crystallite size alumina.

Example 4

The Pseudoboehmite alumina support is further analyzed for its characteristics with respect to crystallization temperature, reaction temperature, crystallization time, effect of acidic and basic source:

TABLE 2

Effect of crystallization temperature (CT, ° C.)

| S. No. | CT° C. | Characteristics of Pseudoboehmite alumina support (Alumina phase is pseudoboehmite) | | | Characteristics of microsphere alumina support | | | Result (Pass/Fail) |
|---|---|---|---|---|---|---|---|---|
| | | Crystallinity | Crystallite size (Å) | SA | ABD (g/cc) | % attrition | SA | |
| 1 | 35 | 78 | 35 | 295 | 0.59 | 12 | 142 | Fail |
| 2 | 70 | 95 | 36 | 310 | 0.65 | 11 | 150 | Fail |
| 3 | 90 | 97 | 40 | 345 | 0.68 | 11 | 162 | Fail |
| 4 | 110 | 97 | 41 | 352 | 0.69 | 10 | 173 | Fail |
| 5 | 130 | 99 | 45 | 360 | 0.69 | 10 | 185 | Fail |

Method of addition: Sequential; Acidic source: Aluminium sulphate; Basic source: Caustic lye (Sodium hydroxide); Reaction temperature: 35° C.; Crystallisation time: 12 h; Final pH during precipitation: 9.5.

The effect of crystallization temperature was studied between 35-130° C. When crystallization temperature is increased, there is an increase in crystallinity, crystallite size, surface area, and apparent bulk density (ABD) and a decrease in % attrition.

TABLE 3

Effect of reaction temperature during precipitation (RT° C.)

| S. No | RT °C. | CT° C. | Characteristics of Pseudoboehmite alumina support (Alumina phase is pseudoboehmite) | | | Characteristics of microsphere alumina support | | | Result (Pass/Fail) |
|---|---|---|---|---|---|---|---|---|---|
| | | | Crystallinity | Crystallite size (Å) | SA | ABD (g/cc) | % attrition | SA | |
| 1 | 35 | 35 | 78 | 35 | 295 | 0.59 | 12 | 142 | Fail |
| 2 | 70 | 70 | 92 | 48 | 284 | 0.60 | 18 | 132 | Fail |
| 3 | 90 | 90 | 95 | 54 | 289 | 0.62 | 19 | 130 | Fail |

Method of addition: Sequential; Acidic source: Aluminium sulphate; Basic source: Caustic lye; crystallisation time: 12 h; Final pH dining precipitation: 9.5.

The effect of reaction temperature was studied at 35, 70 and 90° C. during precipitation, kept crystallization temperature unchanged with respective reaction temperature. With increase in reaction temperature, crystallinity and crystallite size also increased. However, the % attrition also increased with increase in the reaction temperature.

TABLE 4

Effect of crystallization time (h):

| S. No. | Crystalline Time (h) | Characteristics of Pseudoboehmite alumina support (Alumina phase is pseudoboehmite) | | | Characteristics of microsphere alumina support | | | Result (Pass/Fail) |
|---|---|---|---|---|---|---|---|---|
| | | Crystallinity | Crystallite size (Å) | SA | ABD (g/cc) | % attrition | SA | |
| 1 | 6 | 80 | 52 | 280 | 0.55 | 22 | 138 | Fail |
| 2 | 12 | 97 | 40 | 345 | 0.68 | 11 | 162 | Fail |
| 3 | 18 | 98 | 33 | 363 | 0.80 | 7 | 193 | Pass with respect to ABD and fails wrt attrition |
| 4 | 24 | 98 | 28 | 381 | 0.95 | 4 | 221 | Pass |
| 5 | 48 | 99 | 24 | 421 | 0.96 | 2 | 248 | Pass |

Method of addition: Sequential; Acidic source: Aluminium sulphate; Basic source Caustic lye; crystallisation temperature: 90° C.; Reaction temperature: 35° C.; Final pH during precipitation: 9.5.

The effect of crystallization time was studied from 6 h to 48 h, maintaining crystallization temperature (90° C.) and reaction temperature (35° C.) constant. While increasing the crystallization time, the crystallinity increases, but crystallite size of pseudoboehmite alumina support decreases considerably. The microspheres prepared from small crystallite size alumina support showed very low % attrition.

TABLE 5

Effect of Base source:

| S. No. | Base source | Characteristics of Pseudoboehmite alumina support (Alumina phase is pseudoboehmite) | | | Characteristics of microsphere alumina support | | | Result (Pass/Fail) |
|---|---|---|---|---|---|---|---|---|
| | | Crystallinity | Crystallite size (Å) | SA | ABD (g/cc) | % attrition | SA | |
| 1 | Caustic lye (sodium hydroxide) | 98 | 28 | 381 | 0.95 | 4 | 221 | Pass |

TABLE 5-continued

Effect of Base source:

| S. No. | Base source | Characteristics of Pseudoboehmite alumina support (Alumina phase is pseudoboehmite) | | | Characteristics of microsphere alumina support | | | Result (Pass/Fail) |
|---|---|---|---|---|---|---|---|---|
| | | Crystallinity | Crystallite size (Å) | SA | ABD (g/cc) | % attrition | SA | |
| 2 | Sodium aluminate | 99 | 24 | 310 | 0.91 | 5 | 152 | Pass |
| 3 | Ammonium hydroxide | 97 | 30 | 296 | 0.79 | 6 | 132 | Pass |

Method of addition: Sequential; Acidic source: Aluminium sulphate; crystallisation temperature: 90° C.; Reaction temperature: 35° C.; Final pH during precipitation: 9.5; crystallisation time: 24 h.

The effect of varying base source was studied by employing different sources, caustic lye, sodium aluminate and ammonium hydroxide. Using caustic lye and sodium aluminate sources, alumina support microspheres showed high ABD.

TABLE 6

Effect of acidic source:

| S. No. | Acidic source | Characteristics of Pseudohoehmite alumina support (Alumina phase is pseudoboelimite) | | | Characteristics of microsphere alumina support | | | Result (Pass/Fail) |
|---|---|---|---|---|---|---|---|---|
| | | Crystallinity | Crystallite size (Å) | SA | ABD (g/cc) | % attrition | SA | |
| 1 | Aluminium sulphate | 98 | 28 | 381 | 0.95 | 4 | 221 | Pass |
| 2 | Aluminium nitrate | 96 | 32 | 309 | 0.85 | 5 | 152 | Pass |
| 3 | Aluminium chloride | 96 | 27 | 286 | 0.80 | 5 | 138 | Pass |

Method of addition: Sequential; Basic source: Caustic lye; crystallisation temperature: 90° C.; Reaction temperature: 35° C.; Final pH during precipitation: 9.5; crystallisation time: 24 h.

The effect of varying acidic source was studied by employing different sources, aluminium sulphate, aluminium nitrate and aluminium chloride. The alumina support microspheres prepared from aluminium sulphate source possessed the characteristics of high ABD and low % of attrition as compared with other acidic sources.

TABLE 7

Effect of concentration of caustic lye:

| S. No. | Caustic lye Concentration % | Characteristics of Pseudoboehmite alumina support (Alumina phase is pseudobodimite) | | | Characteristics of microsphere alumina support | | | Result (Pass/Fail) |
|---|---|---|---|---|---|---|---|---|
| | | Crystallinity | Crystallite size (Å) | SA | ABD (g/cc) | % attrition | SA | |
| 1 | 3.1 | 98 | 20 | 401 | 0.96 | 4 | 232 | Pass |
| 2 | 6.4 | 98 | 28 | 381 | 0.95 | 4 | 221 | Pass |
| 3 | 11.8 | 98 | 36 | 354 | 0.89 | 7 | 189 | Pass wtr ABD and fail wrt attrition |

TABLE 7-continued

Effect of concentration of caustic lye:

| | | Characteristics of Pseudoboehmite alumina support (Alumina phase is pseudobodimite) | | | Characteristics of microsphere alumina support | | | |
|---|---|---|---|---|---|---|---|---|
| S. No. | Caustic lye Concentration % | Crystallinity | Crystallite size (Å) | SA | ABD (g/cc) | % attrition | SA | Result (Pass/Fail) |
| 4 | 25.3 | 96 | 53 | 312 | 0.85 | 9 | 157 | Pass wtr ABD and fail wrt attrition |

Method of addition: Sequential; Basic source: Caustic lye; crystallisation temperature: 90° C.; Reaction temperature: 35° C.; Final pH during precipitation: 9.5; crystallisation time: 24 h.

The concentration of caustic lye was studied for the concentration of 3.1, 6.4, 11.8 and 25.3. At low concentration, the prepared support microspheres showed high ABD and low % attrition.

We claim:

1. An additive support for a CO oxidation promoter additive comprising pseudoboehmite alumina having a crystallite size in the range of 10 to 20 Å, a surface area in the range of 200 to 450 m²/g, an average pore diameter in the range of 35 to 45 Å, and an average pore volume in the range of 0.2 to 0.6 cm³/gm;
   wherein the additive support is having self-binding properties and less than 0.2% of residual sodium oxide;
   wherein the additive support is prepared by a process comprising: (a) reacting aluminium sulphate with sodium hydroxide by sequential addition of sodium hydroxide solution into solution of aluminium sulphate at a temperature of 25 to 100° C. to obtain a slurry, (b) continuing the reaction until pH of the slurry is reached to 9.5, (c) filtering the slurry to obtain a wet cake, (d) washing the wet cake with hot water, (e) hydrothermal treatment for crystallization of wet cake at a crystallization temperature of 70 to 130° C. for the duration in the range of 12 h-48 h and filter the crystallize material to obtain pseudoboehmite alumina support, (f) preparing a slurry by intimate mixing of pseudoboehmite alumina support and water, (g) peptizing with an organic acid under stirring, and (h) spray drying the slurry of step (g) to obtain microspheres of pseudoboehmite alumina support;
   wherein the CO oxidation promoter additive is having an apparent bulk density (ABD) above 0.95 g/cm³, and an attrition of less than 5%;
   wherein the CO oxidation promoter additive is having conversion efficiency in the range of 85-97 and $CO_2$/CO ratio in the range of 20-51.

2. The support of claim 1 having a surface area in the range of 250 to 430 m²/gm.

3. The support of claim 1 having an average pore volume in the range of 0.3 to 0.6 cm³/gm, and an average pore diameter in the range of 40 to 45 Å.

4. The support of claim 1 having a crystallinity more than 92%, and a crystallite size of 20 Å.

5. A process for preparing the additive support comprising pseudoboehmite alumina of claim 1, the process comprising:
   (a) reacting aluminium sulphate with sodium hydroxide at a temperature of about 25 to about 100° C. to obtain a slurry,
   (b) continuing the reaction until pH of the slurry is reached to about 9.5,
   (c) filtering the slurry to obtain a wet cake,
   (d) washing the wet cake with hot water,
   (e) hydrothermal treatment for crystallization of wet cake at a crystallization temperature of about 70 to about 130° C. for the duration of above 12 h-48 h and filter the crystallize material to obtain pseudoboehmite alumina support;
   preparing a slurry by intimate mixing of pseudoboehmite alumina support and water,
   (g) peptizing with an organic acid under stirring, and
   (h) spray drying the slurry of step (g) to obtain microspheres of pseudoboehmite alumina support.

6. The process of claim 5, wherein the reaction of aluminium sulphate with sodium hydroxide is carried out by sequential addition of sodium hydroxide solution into solution of aluminium sulphate.

7. The process of claim 5, wherein the reaction of aluminium sulphate with sodium hydroxide is carried out at a temperate of about 35° C. for 0.5 to 5 hours.

8. The process of claim 5, wherein the concentration of sodium hydroxide is about 3 to about 7 wt %.

9. The process of claim 5, wherein the washing of wet cake is carried out by hot water at a temperature of 60 to 80° C.

10. The process of claim 5, wherein crystallization of alumina cake is carried out at a temperature of about 80° C. to about 120° C. for the duration of above 12 h-48 h.

11. The process of claim 5, wherein the organic acid for peptizing is selected from the group comprising formic acid, acetic acid and mixtures thereof.

12. A process for the preparation of the carbon monoxide (CO) oxidation promoter additive of claim 1 having improved apparent bulk density (ABD) and attrition properties for use in hydrocarbon conversion, comprising the steps of:
   (a) preparing a pseudoboehmite alumina support by reacting aluminium sulphate with sodium hydroxide at a temperature ranging from about 25 to about 100° C.;
   (b) preparing a slurry by mixing the pseudoboehmite alumina of step (a) with water;
   (c) peptizing the slurry prepared in step (b) with an organic acid under stirring;
   (d) spray drying the peptized slurry obtained in step (c) to obtain microspheres;
   (e) calcining the microspheres of step (d) to obtain calcined microspheres, (f) impregnating the microspheres of step (e) with a group VIII B metal and drying to obtain CO oxidation promoter.

13. The process of claim 12, wherein the reaction of aluminium sulphate with sodium hydroxide is carried out by sequential addition of sodium hydroxide solution into solution of aluminium sulphate.

14. The process of claim 12, wherein the step (a) further comprises, continuing the reaction of aluminium sulphate with sodium hydroxide until pH of the slurry is reached to about 9.5, filtering the slurry to obtain wet cake, and washing the wet cake with hot water to obtain pseudoboehmite alumina support.

15. The process of claim 12, wherein crystallization of alumina cake is carried out at a temperature of about 80 to about 120° C. for the duration of above 12 h-48 h.

16. The process of claim 12, wherein the organic acid for peptizing is selected from the group comprising formic acid, acetic acid, and mixtures thereof.

17. The process of claim 12, wherein the calcining is carried out at a temperature of about 450 to about 650° C.

18. The process of claim 12, wherein the group VIII B metal is selected from platinum and palladium.

19. The CO oxidation promoter additive of claim 12 having, and an attrition of less than 5%, pore volume 0.2-0.5 cc/gm and average pore diameter in the range of 40-45 Å.

20. A method of promoting CO oxidation during fluid catalytic cracking of a hydrocarbon feedstock into lower molecular weight components said method comprising contacting a hydrocarbon feedstock with a cracking catalyst and the CO oxidation promoter additive of claim 19, said CO oxidation promoter being present in an amount sufficient to reduce said CO emissions.

21. The method of claim 20, wherein the additive is mixed with the cracking catalyst at 0.3% concentration having platinum less than 3 ppm in the total catalyst and additive mixture.

22. The method of claim 20, wherein the catalyst is spent catalyst.

* * * * *